United States Patent [19]

Kunin

[11] Patent Number: 4,747,955

[45] Date of Patent: May 31, 1988

[54] PURIFICATION OF LIQUIDS WITH TREATED POLYESTER FIBERS

[75] Inventor: Robert Kunin, Yardley, Pa.

[73] Assignee: The Graver Company, Union, N.J.

[21] Appl. No.: 37,949

[22] Filed: Apr. 13, 1987

[51] Int. Cl.$^4$ .............................................. B01D 37/02
[52] U.S. Cl. .................................... 210/679; 210/777; 210/505
[58] Field of Search ............... 210/679, 686, 691, 692, 210/694, 767, 777, 778, 503–505, 508

[56] References Cited

U.S. PATENT DOCUMENTS 4,238,334  12/1980  Halbfoster ........................... 210/505
4,664,812  5/1987  Klein ................................... 210/679

*Primary Examiner*—Ivars Cintins
*Attorney, Agent, or Firm*—Dressler, Goldsmith, Shore, Sutker & Milnamow, Ltd.

[57] ABSTRACT

A method for removing impurities from a liquid utilizing a filter bed having polyester fibers which have been treated with a hot caustic solution to increase the hydrophilicity of the polyester fibers. The caustic solution preferably contains a surfactant to increase the initial wetting of the polyester fibers.

30 Claims, No Drawings

PURIFICATION OF LIQUIDS WITH TREATED POLYESTER FIBERS

FIELD OF THE INVENTION

The present invention relates generally to an improved method for removing impurities from a liquid, and more specifically to precoat filter beds containing polyester fibers.

BACKGROUND OF THE INVENTION

In certain water treatment applications, there is a requirement for the production of extremely pure water, including the removal of both dissolved and suspended or colloidal materials. One area where such a requirement is particularly important is in the steam generation of electrical power, in both fossil fuel and nuclear power plants. In both types of installations, it is common practice to include a filter bed in the recycle stream for the steam turbines.

A significant breakthrough in the purification of such liquid streams is described and claimed in U.S. Pat. Nos. 3,250,702 and 3,250,703, both of which are assigned to the assignee of this application. The invention described in these patents is based on the discovery that when finely divided anion and cation exchange resin particles are mixed in aqueous suspension, a volume increase is noted. This volume increase is the result of an agglomeration or "clumping" between the anion and cation exchange resin particles. Such resin particles, when used to form a filter bed, produce significantly reduced pressure drops across the bed, together with longer run lengths and improved efficiency of dissolved and undissolved solids removal.

As used herein, the term "bed" refers to a layer, such as a precoat layer, which has been deposited on a filter screen, a wound, annular filter cartridge, a film, a deep or shallow bed, or the like, such a bed may advantageously be deposited on a tubular filter cartridge such as those described in U.S. Pat. Nos. 3,279,608 and 3,779,386, which are assigned to the assignee of this application. Filter presses, vertical and horizontal leaf filters as well as sand and multilayer filters may also be used.

Although ion exchange resin mixtures form a highly efficient filtration system, the ion exchange resins are expensive, and, in some instances, ion exchange capacity is unnecessary. That is, it is sometimes desired to employ a filter having a reduced pressure drop and increased efficiency primarily for the removal of finely divided suspended particles ("crud") from liquids. There are also many instances where it is desirable to employ a non-ion exchange material overlay over the above-described mixed ion exchange resins. Such an overlay is particularly desirable when the liquid being filtered contains suspended particles which interfere with the ion exchange resin. Another advantage to the use of an overlay on precoated filters is that backwashing of the filter to remove the precoat is generally easier than it is when the overlay material is used alone.

A method for removing impurities from a liquid by passing the liquid through a filter bed which comprises a mixture of oppositely charged particles of filter aid material is described and claimed in U.S. Pat. No. 4,177,142, which is assigned to the assignee of this application. The filter aid materials are disclosed as including diatomaceous earth, cellulose fibers, charcoal, expanded perlite, asbestos fibers, ion exchange resins, and inorganic ion exchangers. The filter bed comprises a mixture of oppositely charged particles of filter aid material. The filter aid particles normally have a surface charge in aqueous suspension, and a portion of the particles is treated with a chemical compound to produce a surface charge which is opposite to the normal surface charge. A mixture of oppositely charged particles (normal and reversed) is therefore produced, and the "clumping" phenomenon is achieved.

A method for removing impurities from a liquid by passing the liquid through a filter bed which comprises treated filter aid material which is mixed with finely divided ion exchange resin particles in the size range of 60 to 400 mesh is disclosed and claimed in U.S. Pat. No. 4,190,532, which is assigned to the assignee of this application. The mixture of treated filter aid material and ion exchange resin particles produces a clumping phenomenon. The filter aid materials are disclosed as including cellulose fibers, diatomaceous earth, charcoal, expanded perlite, asbestos fibers and polyacrylonitrile fibers. The ion exchange resin particles are disclosed as including cation exchange resins, anion exchange resins and a mixture of both. The filter aid materials is treated with a chemical compound to produce the required surface charge.

A method for removing impurities from a liquid by passing the liquid through a filter bed which comprises a mixture of treated fibrous filter aid material and an active particulate material is disclosed in U.S. Pat. No. 4,238,334, which is assigned to the assignee of this application. The "fibrous filter aid materials" are disclosed as including cellulose fibers, polyacylanitrile fibers, Teflon fibers, nylon fibers, rayon fibers, polypropylene fibers, and polyvinyl chloride fibers. The "active particulate materials" are disclosed as including activated carbon, adsorptive clays such as bentonite, molecular sieves such as zeolites, zirconium oxides, zirconium phosphate, iron sulfide, diatomaceous earth, synthetic adsorbants and activated alumina. The filter aid material is treated with a chemical compound to produce the required surface charge.

In U.S. Pat. No. 3,880,754 a method for removing impurities from a liquid is disclosed which comprises passing the liquid through a bed of a cation and an anion exchange resin mixed with a filter aid material comprising ground fibers of polyacrylanitrile, a polyamide or a mixture thereof. There is no disclosure of treatment of the filter aid material to alter its surface charge.

There is no disclosure in the prior art of the use of polyester fibers as a filter aid material in the formulation of filter beds used in the removal of impurities from liquids passing therethrough. Polyester fibers are non-biodegradable and therefore filter beds formulated therefrom are more easily disposed of. Polyester fibers are less compressible than the cellulosic fibers, most commonly used as filter aid materials in filter bed formulations, and hence the pressure drop of polyester fiber containing filter beds is less than the pressure drop of cellulosic fiber containing filter beds. Polyester fibers are more chemically stable than the cellulosic fibers, and hence may be used at extremes of pH and temperature which would degrade the cellulosic fibers.

However, despite the above-mentioned advantages of the use of polyester fibers as a filter aid material in formulating filter beds, it has not heretofore been practical to substitute such fibers for the commonly used cellulosic fibers. It has been found that polyester fibers are too hydrophobic to be of practical use in filter bed formulations, particularly when such formulations are precoated onto a filter screen or tubular filter cartridge. Prior attempts to use polyester fibers as a filter aid material in filter bed formulations have encountered problems with unacceptable high levels of floating fibers and poor precoatability and backwashability of the filter bed formulations. Until these problems were solved, polyester fibers could not be successfully used as a filter aid material in filter bed formulations.

DESCRIPTION OF PREFERRED EMBODIMENTS OF THE INVENTION

The present invention is directed to the utilization of polyester fibers as a filter aid material particularly for use in precoat filter formulations. It has been found that polyester fibers may be useful as a filter aid material upon treatment of the fibers with a hot caustic solution to convert the normally hydrophobic surface of the fibers to a hydrophilic surface. The caustic solution preferably contains a surfactant to increase the initial wetting of the polyester fibers.

In accordance with preferred embodiments of the invention, filter beds are formulated containing polyester fibers which are treated in a 2% to 4% sodium hydroxide solution having a temperature above 90° F. and below the softening temperature of the polyester fibers, preferably about 140° F., for at least one hour. Caustic solutions including those of potassium hydroxide, lithium hydroxide, and quatenary ammonium hydroxide compounds may alternatively be used to treat the polyester fibers. A surfactant is preferably added to the caustic to increase the initial wetting of the polyester fibers. A low foaming, nonionic surfactant such as Triton CF-54 from Rohm and Haas Co. is preferred. The treated polyester fibers are then rinsed down in a conventional manner to less than approximately 10 umhos.

The above-described treatment of the polyester fibers converts the normally hydrophobic surface thereof to a hydrophilic surface and thereby renders the fibers useful as a filter aid material for use in precoat filter formulations. One significant advantage of the use of polyester fibers as a substitute for cellulosic fibers, typically used as a filter aid material in precoat filter formulations, is that the polyester fibers are non-biodegradable and therefore more readily disposed of after use. Another significant advantage of polyester fibers over cellulosic fibers is that the compressibility and hence the pressure drop of the polyester fiber containing precoats are less than those of cellulosic fiber containing precoats. Another significant advantage of polyester fibers over cellulosic fibers is that they are less susceptible to chemical degradation by acids and bases. Further, it has been determined that the precoat products containing polyester fibers treated in accordance with the invention have significantly fewer floaters and enhanced precoatability and backwashability characteristics. However, until the problem of the hydrophobicity of the polyester fiber was recognized and solved by the treatment of the present invention, the use of polyester fiber containing precoats was not practical to overcome the biodegradability and compressibility problems encountered by cellulosic fiber containing precoats.

Examples of polyester [most commonly poly(ethylene-terephthalate)] fibers which may be used in practicing the present invention include Dacron and Terylene. These fibers may be processed by chopping or grinding. The useful processed fiber length is 20 to 500 micrometers, preferably 100 to 250 micrometers.

The polyester fibers treated in accordance with the present invention may be utilized as a precoat filter aid material by itself or as an overlay layer to a precoat containing a layer of active particulate material or ion exchange resins. The treated polyester fibers may also be mixed with ion exchange resins or active particulate materials in formulating a precoat filter bed. The discussion which hereinbelow follows describes preferred embodiments of filter beds utilizing polyester fibers treated in accordance with the invention. The following examples are intended to illustrate the present invention, and should not be construed as limitative, the scope of the invention being determined by the appended claims.

EXAMPLE I

A filter bed is provided comprising polyester fibers between 100 and 250 micrometers in length which are treated in accordance with the present invention. The polyester fibers are treated in a 2% to 4% sodium hydroxide solution at about 140° F. for at least one hour. To increase the initial wetting of the fibers a surfactant, such as Triton CF-54 or Igepal DM-710 from GAF Corporation, may be added to the sodium hydroxide solution. The treated polyester fibers are then rinsed down in a conventional manner to less than approximately 10 umhos. Approximately 5% to 95%, preferably about 50%, of the treated polyester fibers is further treated in aqueous suspension with a cationic polyelectrolyte to produce a positive surface charge by bonding to the surface of the polyester fibers and the remainder of the treated polyester fibers is preferably further treated in aqueous suspension with a cationic polyelectrolyte and then with an anionic polyelectrolyte to produce an enhanced negative surface charge by bonding to the polyester fibers previously treated with the cationic polyelectrolyte, as disclosed in U.S. Pat. No. 4,177,142, which patent is incorporated herein by reference. The polyester fibers are dewatered and resuspended in water and precoated onto a filter, such as a tubular, nylon-wound filter element or stainless steel filter element, to produce better filtration characteristics together with a lower pressure drop than would be produced with polyester fibers which had not had the caustic treatment.

EXAMPLE II

A filter bed is provided comprising a layer of ion exchange resin particles and a layer of polyester fibers treated in accordance with the present invention. A layer of ion exchange resin comprising anion exchange resin particles, cation exchange resin particles or a mixture of anion exchange and cation exchange particles is precoated on a tubular, wound nylon filter element or stainless steel filter element in an amount of about 0.2 pound per square foot of filter element. The ion exchange resin is preferably in the size range of about 60 to 400 mesh, as described in U.S. Pat. No. 3,250,703. A layer of treated polyester fibers treated as described in Example I is applied over the precoat of ion exchange particles in an amount of about 0.06 pound per square foot. The layer of treated polyester fibers over the ion exchange resin particles effectively removes the bulk of the iron oxide, preventing the cracking of the ion exchange resin layer without materially increasing the pressure drop through the bed.

EXAMPLE III

A filter bed is provided comprising a mixture of cation ion exchange resin particles and polyester fibers treated in accordance with the invention. The polyester fibers are treated with caustic as described in Example I, rinsed, and then treated in aqueous suspension with a cationic polyelectrolyte to produce a positive surface charge by bonding to the surface of the polyester fibers. The treated polyester fibers are dewatered and added to an aqueous suspension of cation exchange resin particles or a mixture of cation exchange particles and anion exchange particles, as disclosed in U.S. Pat. No. 4,190,532, which patent is incorporated herein by reference. The resin particles are preferably in the size range of about 60 to 400 mesh. The filter bed is then deposited on a tubular, nylon-wound filter element or stainless steel filter element to produce a uniform precoat having a depth of about ¼ inch. The polyester fibers present in the mixture are preferably in an amount of from 20% to about 80%, based on the weight of the ion exchange resin particles.

EXAMPLE IV

A filter bed is provided comprising a mixture of anion exchange resin particles and polyester fibers treated in accordance with the invention. The polyester fibers are treated with caustic as described in Example I, rinsed, and then treated in aqueous suspension with a cationic polyelectrolyte to produce a positive surface charge by bonding thereon and further treated with an anionic polyelectrolyte to produce an enhanced negative surface charge by bonding to the polyester fibers, as disclosed in U.S. Pat. No. 4,190,532, which patent is incorporated herein by reference. The treated polyester fibers are then dewatered and added to an aqueous suspension of anion exchange resin particles, preferably in the size range of about 60 to 400 mesh. The filter bed is then deposited on a filter element as described in Example III.

EXAMPLE V

A filter bed is provided comprising a mixture of active particulate material and polyester fibers treated in accordance with the invention. The polyester fibers are treated with caustic as described in Example I, rinsed, and then treated in aqueous suspension with a cationic polyelectrolyte to produce a positive surface charge by bonding to the surface of the polyester fibers. The treated polyester fibers are dewatered and added to an aqueous suspension of an active particulate material depending on the particular application as disclosed in U.S. Pat. No. 4,238,334, which patent is incorporated herein by reference. Examples of active particulate materials include activated carbon, zeolites, bentonite, zirconium phosphate, zirconium oxide, ferrous sulfide, and diatomaceous earth. The filter bed is then deposited on a tubular, nylon-wound element or stainless element in an amount to result in a coverage of about 0.2 lb./ft$^2$.

EXAMPLE VI

A filter bed is provided comprising a mixture of anion and cation ion exchange resin particles and polyester fibers treated in accordance with the invention. The polyester fibers are treated and mixed with a mixture of anion and cation exchange resin particles as set forth in Example III. The filter bed comprises approximately equal amounts based on the weight thereof of polyester fibers, anion exchange resin particles and cation exchange resin particles. Approximately 10% to 20% of the anion and cation exchange resin particles is ball milled to a particle size of approximately 10 to 30 microns.

Obviously, many modifications and variations of the invention as hereinbefore set forth will occur to those skilled in the art, and it is intended to cover in the appended claims all such modifications and variations as fall within the true spirit and scope of the invention.

What is claimed is:

1. A method for removing impurities from a liquid comprising: passing said liquid through a filter bed comprising a mixture of oppositely charged polyester fibers, wherein said polyester fibers have been treated with a caustic solution to increase the hydrophilicity of said polyester fibers.

2. The method as defined in claim 1 wherein said caustic solution is a 2% to 4% sodium hydroxide solution.

3. The method as defined in claim 2 wherein said polyester fibers are treated with said caustic solution for at least one hour.

4. The method as defined in claim 1 wherein the temperature of said caustic solution is above 90° F. and below the softening temperature of said polyester fibers.

5. The method as defined in claim 1 wherein the caustic solution contains a surfactant to increase the wetting of said polyester fibers.

6. The method as defined in claim 5 wherein said surfactant is a low foaming nonionic surfactant.

7. The method as defined in claim 1 wherein said polyester fibers have been rinsed after treatment with said caustic solution.

8. The method as defined in claim 1 wherein 5% to 95% of said polyester fibers having been treated in aqueous suspension with a cationic polyelectrolyte to produce a positive surface charge bonding to the surface of said polyester fibers and wherein the remainder of said polyester fibers having been treated in aqueous suspension with a cationic polyelectrolyte and then with an anionic polyelectrolyte to produce a negative surface charge by bonding to said polyester fibers previously treated with said cationic polyelectrolyte.

9. The method as defined in claim 8 wherein said caustic treatment of said polyester fibers precedes said polyelectrolyte treatment of said polyester fibers.

10. A method for removing impurities from a liquid comprising: passing said liquid through a filter bed comprising a mixture of ion exchange resin particles and treated polyester fibers, said ion exchange resin particles and said treated polyester fibers having opposite surface charges in aqueous suspension, and wherein said polyester fibers have been treated with a caustic solution to increase the hydrophilicity of said polyester fibers.

11. The method as defined in claim 10 wherein said caustic solution is a 2% to 4% sodium hydroxide solution.

12. The method as defined in claim 11 wherein said polyester fibers are treated with said caustic solution for at least one hour.

13. The method as defined in claim 10 wherein the temperature of said caustic solution is above 90° F. and below the softening temperature of said polyester fibers.

14. The method as defined in claim 10 wherein said caustic solution contains a surfactant to increase the wetting of said polyester fibers.

15. The method as defined in claim 14 wherein said surfactant is a low foaming nonionic surfactant.

16. The method as defined in claim 10 wherein said polyester fibers have been rinsed after treatment with said caustic solution.

17. The method as defined in claim 10 wherein said polyester fibers having been treated with a cationic polyelectrolyte to produce a positive surface charge by bonding thereon.

18. The method as defined in claim 10 wherein said polyester fibers are present in an amount from 20% to about 80%, based on the weight of said ion exchange resin particles.

19. The method as defined in claim 18 wherein said ion exchange resin particles comprise cation exchange resin particles.

20. The method as defined in claim 18 wherein said ion exchange resin particles comprise anion exchange resin particles.

21. The method as defined in claim 18 wherein said ion exchange resin particles comprise a mixture of cation exchange resin particles and anion exchange resin particles.

22. The method as defined in claim 21 wherein said polyester fibers, said cation exchange resin particles and said anion exchange resin particles are present in approximately equal amounts based on the weight thereof.

23. The method as defined in claim 21 wherein approximately 10% to 20% of the cation exchange resin particles and the anion exchange resin particles have been ball milled to a particle size of approximately 10 to 30 microns.

24. A method for removing impurities from a liquid comprising: passing said liquid through a filter bed comprising a mixture of an active particulate material and treated polyester fibers, said active particulate material and said treated polyester fibers having opposite surface charges in aqueous suspension, and wherein said polyester fibers have been treated with a caustic solution to increase the hydrophilicity of said polyester fibers.

25. The method as defined in claim 24 wherein said caustic solution is a 2% to 4% sodium hydroxide solution.

26. The method as defined in claim 25 wherein said polyester fibers are treated with said caustic solution for at least one hour.

27. The method as defined in claim 24 wherein the temperature of said caustic solution is above 90° F. and below the softening temperature of said polyester fibers.

28. The method as defined in claim 27 wherein said caustic solution contains a surfactant to increase the wetting of said polyester fibers.

29. The method as defined in claim 24 wherein said polyester fibers having been treated with a cationic polyelectrolyte to produce a positive surface charge by bonding thereon.

30. The method as defined in claim 24 wherein said active particulate material is selected from the group consisting of zeolites, bentonite, zirconium oxide, zirconium phosphate, iron sulfide, activated carbon, and diatomaceous earth.

* * * * *